United States Patent
Steinhilb et al.

(10) Patent No.: US 9,415,734 B2
(45) Date of Patent: Aug. 16, 2016

(54) BUMPER ASSEMBLIES FOR VEHICLES

(71) Applicant: Toyota Motor Engineering & Manufacturing North America, Inc., Erlanger, KY (US)

(72) Inventors: Aaron R. Steinhilb, Milan, MI (US); Jeremiah T. Hammer, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/640,484

(22) Filed: Mar. 6, 2015

(65) Prior Publication Data

US 2016/0200271 A1    Jul. 14, 2016

Related U.S. Application Data

(60) Provisional application No. 62/101,550, filed on Jan. 9, 2015.

(51) Int. Cl.
  *B60R 19/56* (2006.01)
  *B60R 19/18* (2006.01)
  *B60R 19/30* (2006.01)

(52) U.S. Cl.
  CPC .......... *B60R 19/18* (2013.01); *B60R 19/30* (2013.01); *B60R 2019/1833* (2013.01); *B60R 2019/1893* (2013.01)

(58) Field of Classification Search
  CPC  B60R 19/18; B60R 19/30; B60R 2019/1833; B60R 2019/1893
  See application file for complete search history.

(56) References Cited

U.S. PATENT DOCUMENTS

| | | |
|---|---|---|
| 6,290,272 B1 | 9/2001 | Braun |
| 6,554,332 B1 | 4/2003 | Schuster et al. |
| 7,144,054 B2 | 12/2006 | Evans |
| 7,740,293 B2 | 6/2010 | Kim |
| 7,823,959 B2 | 11/2010 | Wallman et al. |

FOREIGN PATENT DOCUMENTS

| | | |
|---|---|---|
| CN | 203920646 | 11/2014 |
| DE | 19861026 | 6/2000 |
| DE | 10111146 | 3/2002 |
| DE | 102005021724 | 11/2006 |
| DE | 102009017350 | 10/2010 |
| DE | 102011051442 | 1/2013 |

(Continued)

*Primary Examiner* — Lori L Lyjak
(74) *Attorney, Agent, or Firm* — Dinsmore & Shohl LLP

(57) ABSTRACT

Front bumper assemblies for vehicles are disclosed. The front bumper assemblies may include a bumper reinforcement with a plurality of pedestrian energy absorbers positioned adjacent to a front face of the bumper reinforcement. The plurality of pedestrian energy absorbers are arrayed along a width direction of the bumper reinforcement. A plurality of bumper cover supports are positioned at least one of atop or adjacent the bumper reinforcement and may be attached to the bumper reinforcement. Each of the plurality of bumper cover supports is offset from the forward contact surfaces of the pedestrian energy absorbers in a front impact direction. Each of the plurality of bumper cover supports is more compliant in a front impact direction than in a vertical direction. As a result, a bumper cover of the front bumper assembly is more compliant in a front impact direction while being more rigid in the vertical direction.

20 Claims, 9 Drawing Sheets

(56) References Cited

FOREIGN PATENT DOCUMENTS

| | | |
|---|---|---|
| DE | 102011107995 | 1/2013 |
| EP | 418923 A * | 3/1991 |
| EP | 2540577 | 1/2013 |
| JP | 2014104781 | 6/2014 |
| KR | 20010103288 | 11/2001 |
| KR | 20130123198 | 11/2013 |

* cited by examiner

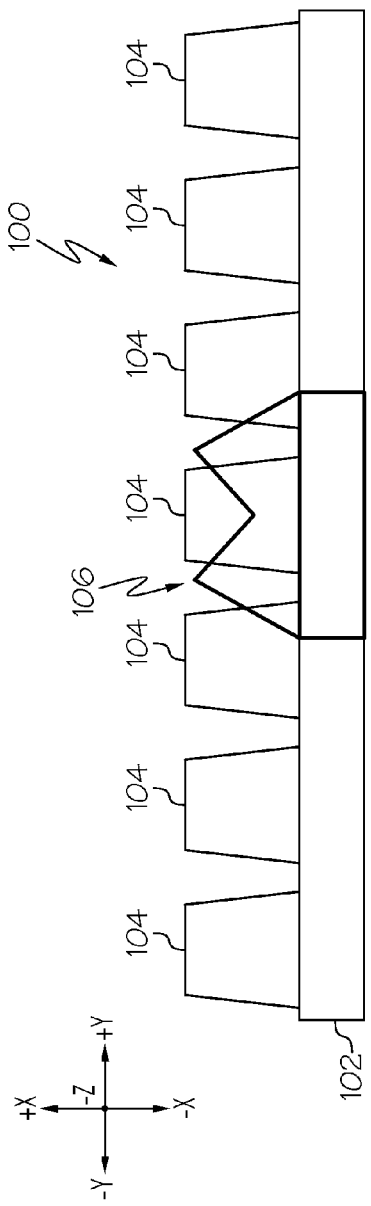
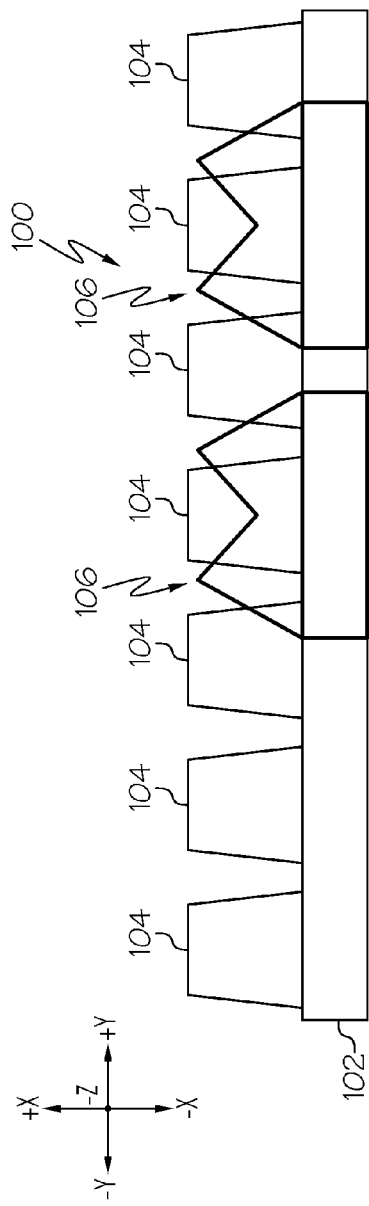

BUMPER ASSEMBLIES FOR VEHICLES

CROSS REFERENCE TO RELATED APPLICATIONS

The present specification claims priority to U.S. Provisional Patent Application Ser. No. 62/101,550, filed Jan. 9, 2015 and entitled "BUMPER ASSEMBLIES FOR VEHICLES," the entirety of which is incorporated by reference herein.

TECHNICAL FIELD

The present specification generally relates to bumper assemblies for vehicles and, more specifically, to bumper assemblies for vehicles with bumper cover supports.

BACKGROUND

Vehicles may be equipped with bumper assemblies and impact protection structures that elastically and plastically deform to absorb energy in the event of an impact. A number of standards and tests currently exist. Various organizations are introducing a number of pedestrian regulations and rating criteria for automotive vehicles. As one example, test methods have been developed to assess the protection of an adult pedestrian by simulating leg-impact conditions during a car-to-pedestrian impact. Generally, under such testing conditions, a bumper assembly with a bumper cover that is compliant in a direction of impact that is parallel to the ground will decrease a bending moment experienced by lower parts of the leg. However, in bumper assemblies constructed with bumper covers that are compliant in this direction, the bumper covers are often overly compliant in the vertical direction, which is undesirable. Accordingly, alternative bumper assemblies are desired.

SUMMARY

In embodiments, a front bumper assembly for a vehicle may include a bumper reinforcement with a plurality of pedestrian energy absorbers positioned adjacent to a front face of the bumper reinforcement. The plurality of pedestrian energy absorbers are arrayed along a width direction of the bumper reinforcement. A plurality of bumper cover supports are positioned atop the bumper reinforcement and may be attached to the bumper reinforcement. Each of the plurality of bumper cover supports is offset from the forward contact surfaces of the pedestrian energy absorbers in a front impact direction. Each of the plurality of bumper cover supports is more compliant in a front impact direction than in a vertical direction. As a result, a bumper cover of the front bumper assembly is more compliant in a front impact direction while being more rigid in the vertical direction.

In one embodiment, a bumper assembly for a vehicle may include a bumper reinforcement, a plurality of energy absorbers, one or more bumper cover supports, and a bumper cover. The bumper reinforcement may have a front face and a top face. The front face may be disposed below and extend away from the top face. The plurality of energy absorbers may be positioned adjacent to the front face of the bumper reinforcement. The plurality of energy absorbers may have forward contact surfaces. The plurality of energy absorbers may be compliant in a front impact direction that intersects the forward contact surfaces. The one or more bumper cover supports may be positioned at least one atop or adjacent to the bumper reinforcement. Each of the one or more bumper cover supports may be more rigid in a vertical direction than in the front impact direction. The a bumper cover may be disposed over and around the bumper reinforcement, the plurality of energy absorbers, and the one or more bumper cover supports.

In another embodiment, a bumper cover support for a bumper assembly of a vehicle may include an injection moldable polymer material and at least a pair of sidewalls, a pair of front walls, and a base. At least a portion of the bumper cover support may be positioned at least one of above or against a bumper reinforcement of the vehicle. The pair of sidewalls, the pair of front walls, and the base may form a substantially enclosed perimeter having walls that, when undeformed, define a center. The bumper cover support may be more rigid in a vertical direction than in a front impact direction normal to the vertical direction and to the base of the bumper cover support.

In yet another embodiment, a vehicle may include a bumper reinforcement, a plurality of energy absorbers, one or more bumper cover supports, and a bumper cover. The bumper reinforcement may have a front face and a top face. The front face may be disposed below and extend away from the top face. The plurality of energy absorbers may have forward contact surfaces and be positioned adjacent to the front face of the bumper reinforcement. The plurality of energy absorbers may be compliant in a front impact direction that intersects the forward contact surfaces. The one or more bumper cover supports may be positioned at least one of atop and adjacent to the bumper reinforcement. The one or more bumper cover supports may extend away from the front face of the bumper reinforcement and cantilever over at least one of the plurality of energy absorbers. each of the one or more bumper cover supports may be more rigid in a vertical direction than in the front impact direction. The bumper cover may have an inner surface. The bumper cover may be disposed over and around the a bumper reinforcement, plurality of energy absorbers, and the one or more bumper cover supports. The one or more bumper cover supports may be spaced apart from the inner surface of the bumper cover.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3A schematically depicts a top view of the front bumper assembly of FIG. 2 without the bumper cover;

FIG. 3B schematically depicts a top view of an alternative front bumper assembly without the bumper cover;

DETAILED DESCRIPTION

Figure 2:
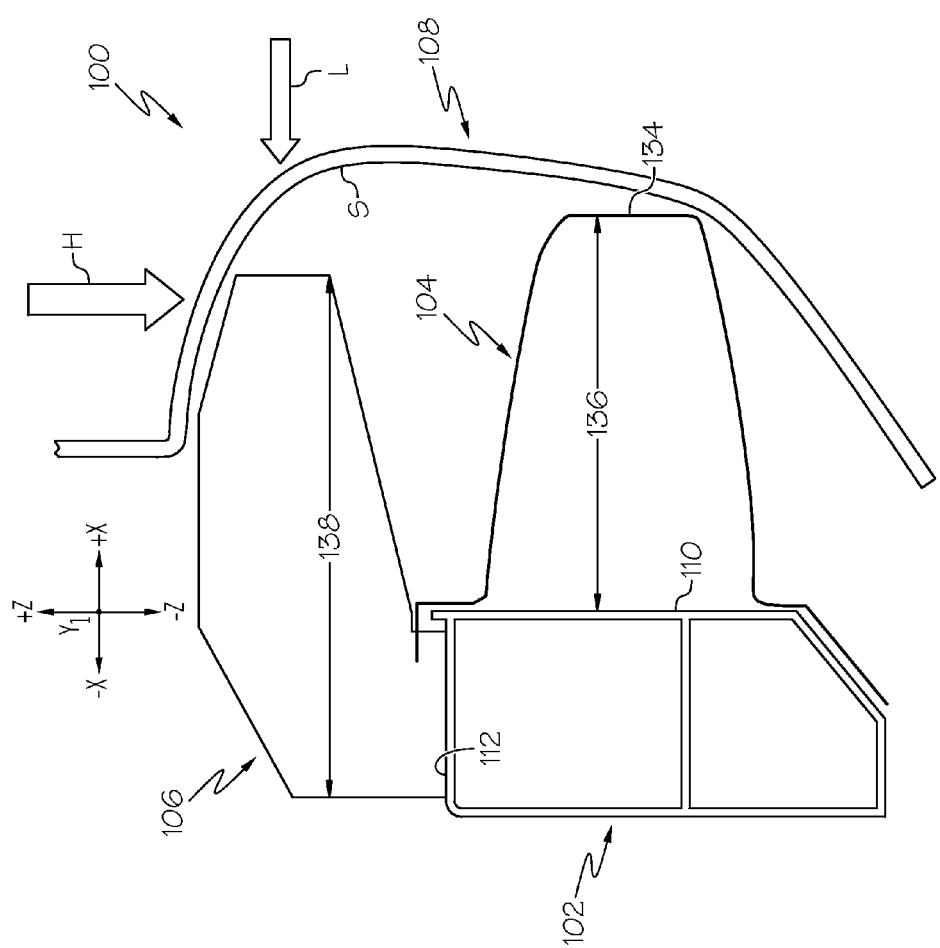
FIG. 2 schematically depicts a cross section of the front bumper assembly of FIG. 1.

FIG. 2 schematically depicts a cross section of one embodiment of a front bumper assembly for a vehicle. The front bumper assembly may include a bumper reinforcement with a plurality of pedestrian energy absorbers positioned adjacent to a front face of the bumper reinforcement. The plurality of pedestrian energy absorbers may be arrayed along a width direction of the bumper reinforcement. A plurality of bumper cover supports may be positioned atop or adjacent to the bumper reinforcement and may be attached to the bumper reinforcement. For example, as shown in FIG. 2, a plurality of bumper cover supports may be positioned atop a top face of the bumper reinforcement while the front face is disposed below and extends away from the top face. Each of the plurality of bumper cover supports may be offset from the forward contact surfaces of the pedestrian energy absorbers in a front impact direction (i.e., the −x direction of the coordinate axes of FIG. 2). Each of the plurality of bumper cover supports is more compliant in the front impact direction than in a vertical direction (i.e., the +/−z directions of the coordinate axes of FIG. 2). As a result, a bumper cover enclosing the bumper reinforcement, the plurality of pedestrian energy absorbers, and the plurality of bumper cover supports is compliant in a front impact direction while being more rigid in the vertical direction. As shown in FIG. 2, the front impact direction intersects the forward contact surfaces of the pedestrian energy absorbers. In embodiments, the angle of intersection may be, for example, a 90 degree angle of intersection. In embodiments, the front impact direction is disposed at an angle with respect to the front face of the bumper reinforcement. For example, FIG. 2 shows the front impact direction disposed at a substantially 90° angle with respect to the front face of the bumper reinforcement. Various embodiments of the bumper cover supports and front bumper covers comprising the same will be described in further detail herein with specific reference to the appended drawings.

In the embodiments described herein, the phrase "front impact direction" refers to the −x direction of the coordinate axes in the figures. The phrase "vertical direction" refers to the +/−z direction of the coordinate axes in the figures. The phrase "width direction" refers to the +/−y direction of the coordinate axes in the figures.

Figure 1:
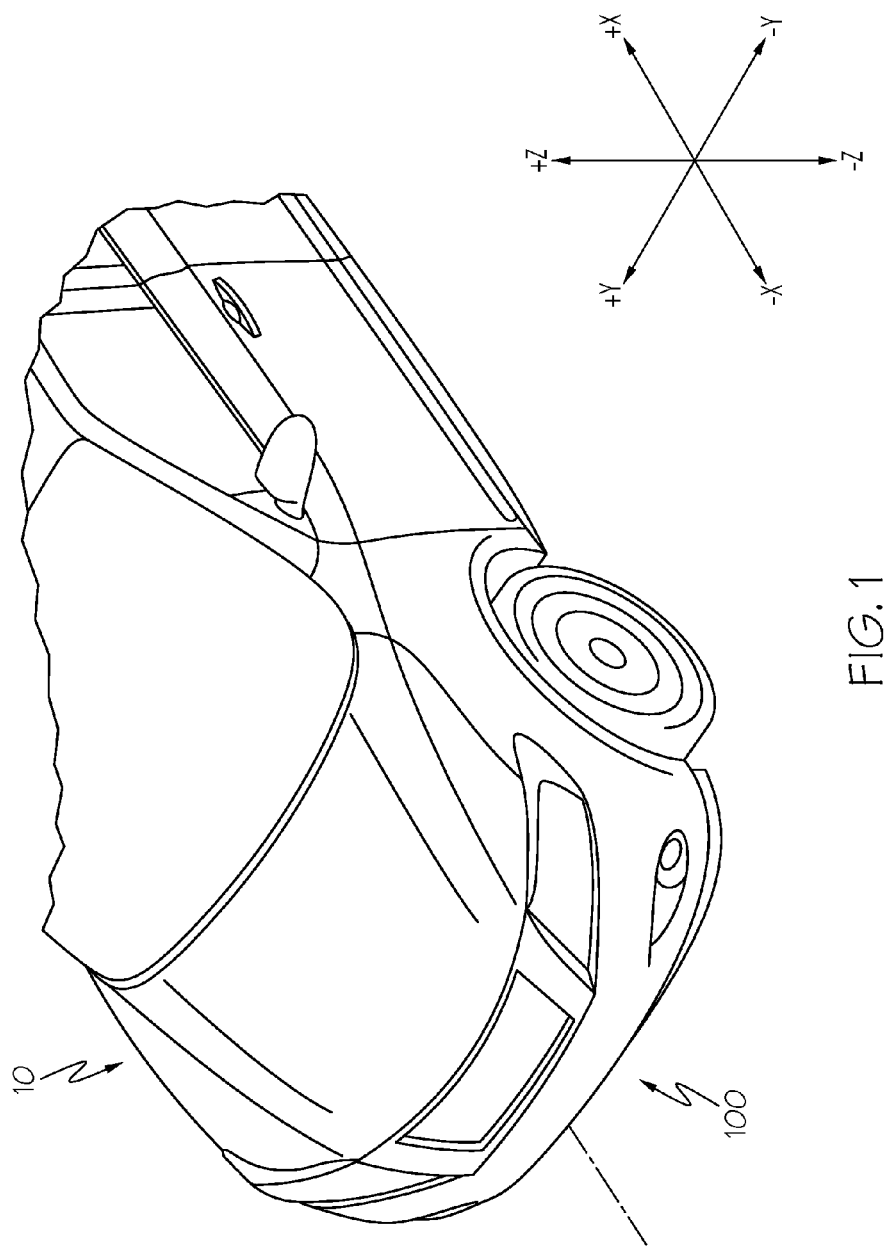
FIG. 1 schematically depicts a vehicle with a front bumper assembly positioned at the front of the vehicle.

Referring now to FIGS. 1 and 2, FIG. 1 schematically depicts a vehicle 10 that includes a bumper assembly 100 coupled to and extending in a width direction of the front of the vehicle 10. The bumper assembly 100 generally includes a bumper reinforcement 102, a plurality of pedestrian energy absorbers 104, a plurality of bumper cover supports 106, and a bumper cover 108, as depicted in FIG. 2. The bumper reinforcement 102 includes a front face 110 and a top face 112.

In the embodiments described herein, the bumper reinforcement 102 of the bumper assembly 100 is supported by the front side members (not depicted) of the vehicle 10. The front side members generally extend in the +/−x direction beneath the body panels (e.g., the front fenders) of the vehicle 10. The bumper reinforcement 102 is connected to the front side members at bumper beam connecting locations that are spaced-apart from one another in a width direction of the vehicle 10. During a collision, such as a front impact collision, the bumper reinforcement 102 directs loads incident on the bumper assembly 100 into the front side members. In embodiments, the bumper reinforcement 102 is made of a thick aluminum and/or a like material, is rigid, and includes a main frame length (i.e., the length of the bumper reinforcement in the width direction) of about 3 feet to about 4 feet.

Referring now to FIGS. 1-3B, the plurality of pedestrian energy absorbers 104 are positioned between the bumper reinforcement 102 and the bumper cover 108. In embodiments, the pedestrian energy absorbers 104 are positioned over a front face 110 of the bumper reinforcement 102 and arrayed along a width direction of the bumper reinforcement 102, as depicted in FIGS. 3A-3B. In some embodiments, the forward contact surfaces 134 of the plurality of pedestrian energy absorbers 104 are spaced apart from an inner surface S of the bumper cover 108. In embodiments, the plurality of pedestrian energy absorbers 104 are constructed to deform and absorb the energy of an impact incident on the bumper assembly 100 in the front impact direction. Accordingly, it should be understood that the plurality of pedestrian energy absorbers 104 are constructed to be more compliant and deformable in the front impact direction than, for example, the bumper reinforcement 102. That is, the plurality of pedestrian energy absorbers 104 are constructed to be more compliant and deformable upon a low force load in the front impact direction (indicated with an arrow L in FIG. 2) than the bumper reinforcement 102.

Still referring to FIGS. 1-3B, the bumper assembly 100 further comprises a plurality of bumper cover supports 106 (one bumper cover support being centrally positioned as depicted in FIG. 3A; a pair of bumper cover supports being depicted in FIG. 3B). The plurality of bumper cover supports 106 are shown as positioned atop the bumper reinforcement 102 and may be attached to the bumper reinforcement 102. In embodiments described further below, the plurality of bumper cover supports 106 may be positioned adjacent and attached to the bumper reinforcement 102. In embodiments, each of the plurality of bumper cover supports 106 are cantilevered over the plurality of pedestrian energy absorbers 104, as depicted in FIGS. 2-3B. In some embodiments, each of the plurality of bumper cover supports 106 extend away from the front face 110 of the bumper reinforcement 102 in the +x direction (i.e., opposite the impact direction), as depicted in FIGS. 2-3B. In some embodiments, each of the plurality of bumper cover supports 106 may have an L-shaped cross section which is assists in positioning the bumper cover supports 106 within the bumper cover 108. In some embodiments, each of the plurality of bumper cover supports 106 is offset from the forward contact surfaces 134 of the pedestrian energy absorbers 104 in the front impact direction. However, in some other embodiments (not shown), the bumper cover supports 106 may be aligned with the forward contact surfaces 134 of the pedestrian energy absorbers 104. In embodiments, as shown in FIG. 2, the front impact direction L is disposed at approximately a 90° angle with respect to a vertical direction. In some embodiments, each of the plurality of bumper cover supports 106 is spaced away from the pedestrian energy absorbers 104 in a vertical direction to allow for deformation of the pedestrian energy absorbers 104 in the event of an impact. In some embodiments, the vertical spacing may be approximately greater than or equal to half of a length 136 of the pedestrian energy absorbers 104 in the front impact direction from the forward contact surfaces 134 to the front face 110 of the bumper reinforcement 102. For example and without limitation, where the length 136 of the pedestrian energy absorbers 104 may be about 110 mm, the vertical spacing between the pedestrian energy absorbers 104 and each of the plurality of bumper cover supports 106 may be greater than or equal to about 55 mm. In some embodiments, for example in designs for lower leg impact, the length 136 of the pedestrian energy absorbers 104 may be about 80 mm. In embodiments, the pedestrian energy absorbers 104 may have a thickness from about 1.5 mm to about 2 mm. In embodiments, a length 138 of each of the plurality of bumper cover supports 106 may be in a range of from about 50 mm to about 150 mm.

In some embodiments, the plurality of bumper cover supports 106 may be mounted vertically and attached to the front face 110 of the bumper reinforcement 102, rather than horizontally along the top face 112 of the bumper reinforcement 102. When mounted vertically, the plurality of bumper cover supports 106 are mounted to the front face 110 of the bumper reinforcement 102 along with the pedestrian energy absorbers 104 on the bumper reinforcement 102. For example, the plurality of bumper cover supports 106 are positioned adjacent to the bumper reinforcement 102 and may be attached to the bumper reinforcement 102. In such embodiments, the bumper reinforcement 102 is sufficiently tall in the vertical direction to accommodate both the plurality of bumper cover supports 106 and the pedestrian energy absorbers 104 being attached to the front face 110 of the bumper reinforcement 102, while still having sufficient spacing inbetween to allow for deformation of the pedestrian energy absorbers 104 in the vertical direction as described above. In embodiments, attachment mechanisms such as clips, bolts, and/or the like may attach the plurality of bumper cover supports 106 to the bumper reinforcement 102, such as to the front face 110 of the bumper reinforcement 102 as described herein.

In some embodiments, the plurality of bumper cover supports 106 may be spaced apart from an inner surface S of the bumper cover 108, as depicted in FIG. 2. Alternatively, the plurality of bumper cover supports 106 may contact the inner surface S of the bumper cover 108 when the bumper cover 108 is in an undeformed state. In the embodiments describe herein, each of the plurality of bumper cover supports 106 is constructed such that the bumper cover support is more compliant in a front impact direction than in a vertical direction. As a result, the bumper cover 108 positioned over and enclosing the bumper reinforcement 102, the plurality of pedestrian energy absorbers 104, and the plurality of bumper cover supports 106 are compliant in the front impact direction L. However, the plurality of bumper cover supports 106 are more rigid in the vertical direction than the front impact direction L which prevents the bumper cover 108 from substantial compliance in the vertical direction, particularly in the −z direction. That is, the bumper cover 108 will not deflect or comply as much when a relatively high force (depicted by an arrow H in FIG. 2) is applied in the −z direction of the coordinated axes depicted in FIG. 2 as when a relatively low force is applied in the −x direction. In embodiments, the plurality of bumper cover supports 106 are more rigid in a vertical direction, as shown by arrow H, than in the front impact direction L that is normal to the vertical direction and to a base of the bumper cover support (such as a base 120 described further below).

In embodiments, the relatively high force may be a target vertical force of 20 kg resulting in deflection of less than or equal to about 5 mm of the bumper cover 108 that is covering the plurality of bumper cover supports 106. In embodiments, the vertical load may be about 10 kg to about 100 kg and the deflection of the bumper cover 108 covering the plurality of bumper cover supports 106 may be less than or equal to 5 mm.

In other embodiments, the vertical load may be about 200 kg to about 300 kg and may result in a deflection of less than or equal to about 10 mm of the bumper cover 108, for example. In embodiments, the plurality of pedestrian energy absorbers 104 absorb a target load of about 6 kN based on a tested front impact direction load (i.e., from a test dummy leg), which meets standards set forth in established global technical regulations (GTRs). In embodiments, the plurality of pedestrian energy absorbers 104 may be about 110 mm in length (or rather 110 mm of stroke) for upper leg testing (i.e., of a hip and femur) and may be about 85 mm in length (or of stroke) for lower leg testing (i.e., of a knee, tibia, and fibula). In embodiments, each of plurality of bumper cover supports 106 may vertically deflect by approximately 0 mm while collapsing in the front impact direction L when subject to the ranges of target loads specified above.

Figure 4:
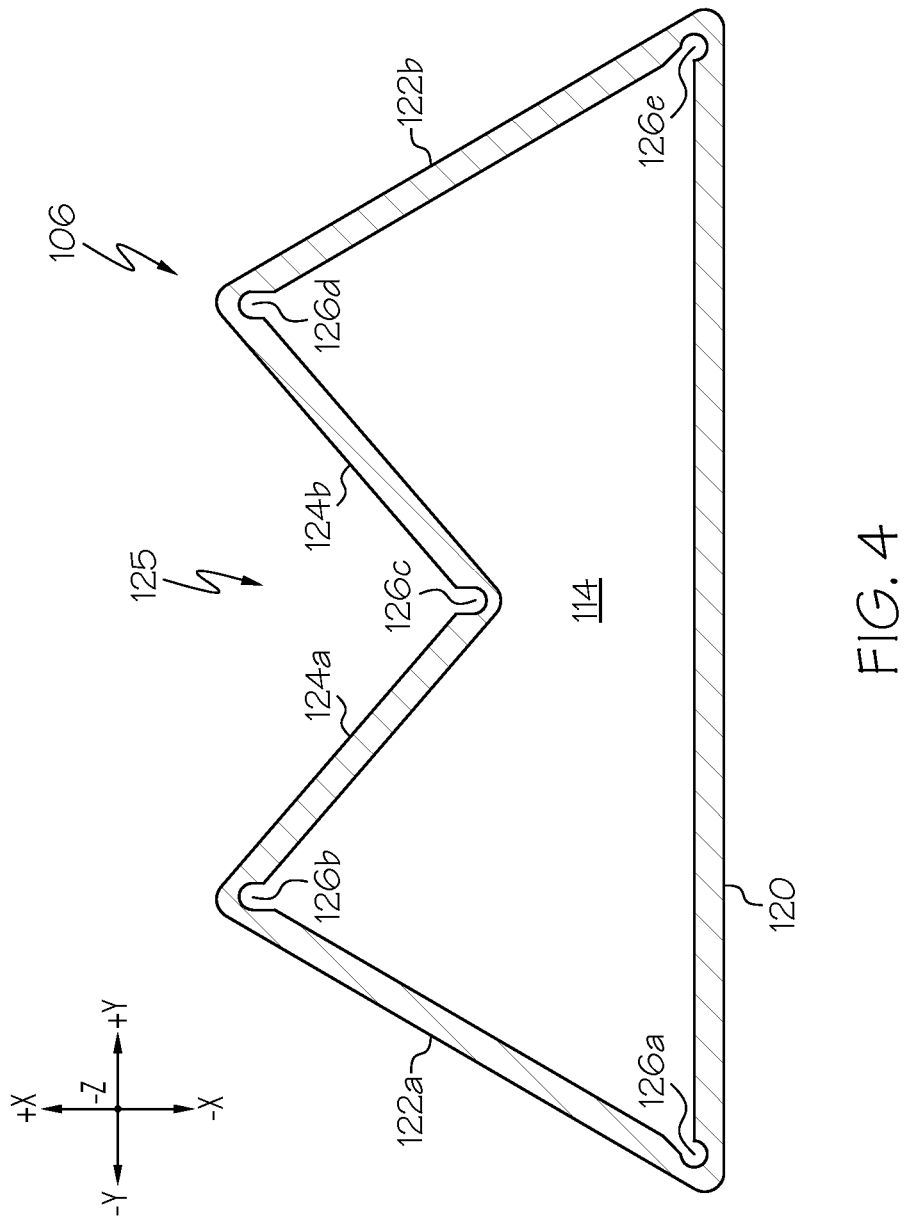
FIG. 4 schematically depicts a cross section of a bumper cover support according to one or more embodiments shown and described herein.

Referring now to FIG. 4, one embodiment of a bumper cover support 106 is schematically depicted in cross section as an example of one construction utilized to make the bumper cover support 106 more compliant in the front impact direction than in the vertical direction. The bumper cover support 106 in embodiments is formed from an injection moldable polymer material such as a thermoplastic including, for example, polypropylene, polystrene, ABS (acrylonitrile butadiene sytrene), and/or like material. In other embodiments, the bumper cover support 106 in embodiments is formed from aluminum. Specifically, the bumper cover support 106 includes a base 120, sidewalls 122a, 122b, and front walls 124a, 124b. In the embodiment of the bumper cover support 106 depicted in FIGS. 4-6, the sidewalls 122a, 122b are coupled to the base 120 and are tapered (i.e., angled toward one another and the center of the bumper cover support 106) such that the base 120 and sidewalls 122a, 122b form three sides of an isosceles trapezoid. The front walls 124a, 124b of the bumper cover support 106 are connected to the ends of the sidewalls 122a, 122b opposite the base and are angled back towards a center of the bumper cover support 106 such that the contact face 125 of the bumper cover support generally has a "V" configuration. As shown in FIG. 4, for example, the base 120, sidewalls 122a, 122b, and front walls 124a, 124b form a substantially enclosed perimeter of the bumper cover support 106 that, when undeformed, has a center 114. The base 120, sidewalls 122a, 122b, and front walls 124a, 124b are made of materials such as a thin aluminum, polymer such as polypropylene or acrylonitrile butadiene styrene (ABS), and/or like materials. A thickness of any of the base 120, sidewalls 122a, 122b, and front walls 124a, 124b may be in a range of from about 1 mm to about 5 mm.

The base 120, sidewalls 122a, 122b, and front walls 124a, 124b are connected at hinges 126a-126e (e.g., molded or living hinges) to achieve a structure which is compliant in the front impact direction. In the embodiments described herein, the hinges 126a-126e are formed from semi-circular reliefs molded into the walls of the bumper cover support 106 to locally thin and weaken the walls of the bumper cover support 106 such that the bumper cover support 106 preferentially collapses in a predetermined manner upon the application of force to the front walls 124a, 124b and/or sidewalls 122a, 122b, such as when a front impact force applied to the bumper cover 108 and the bumper cover 108 is displaced into the bumper cover support 106. In embodiments, a thickness of any of hinges 126a-126e may be less than or equal to about 25% of the thickness of any of the base 120, sidewalls 122a, 122b, and front walls 124a, 124b. For example, for the base 120, sidewalls 122a, 122b, and front walls 124a, 124b having a thickness of 2 mm, the thickness of the hinges 126a-126e is 0.5 mm. While FIG. 4 shows the hinges 126a-126e as being formed from semi-circular reliefs, it should be understood that other configurations are possible, such as a v-notch relief or the like. Further, hinges 126a-126e may be formed from other hinge connection types, such as a pin component and/or the like holding any two of the base 120, sidewalls 122a, 122b, and front walls 124a, 124b together.

The hinges 126a-126e are arranged to facilitate the controlled collapse of the bumper cover support 106 under different loading conditions. For example, in the embodiment of the bumper cover support 106 depicted in FIG. 4, hinges 126a, 126b, 126d, and 126e are located on the internal surfaces of the of the front walls 124a, 124b and sidewalls 122a, 122b and open towards the center 114 of the bumper cover support 106 (when undeformed). Thus, hinges 126a, 126b, 126d, and 126e as shown in FIG. 4 may be referred to as center-facing hinges. However, hinge 126c joining the front walls 124a, 124b is located on the external surface of the front walls 124a, 124b and opens away from the center 114 of the bumper cover support 106. Thus, hinge 126c as shown in FIG. 4 may be referred to as an outwardly-facing hinge. This configuration of the hinges 126a-126e permits the controlled collapse of the bumper cover support 106 under different loading conditions.

Figure 5:
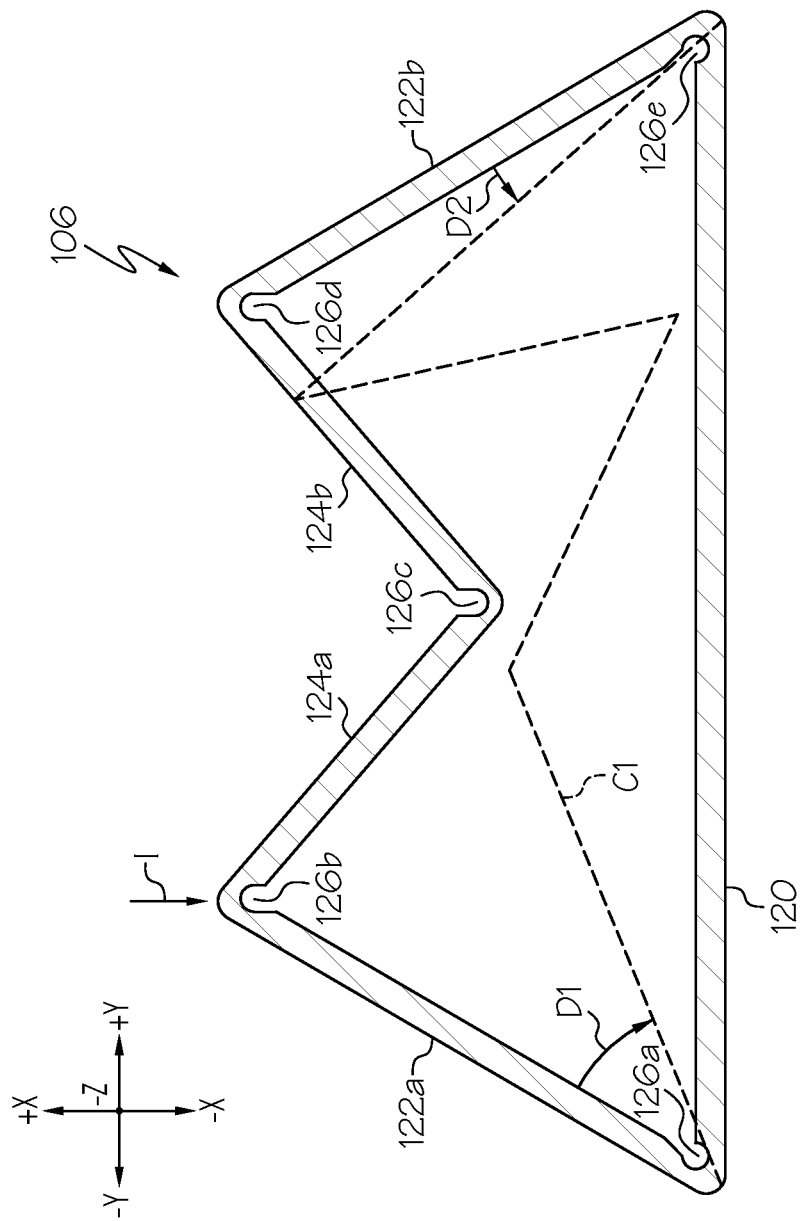
FIG. 5 schematically depicts one mode of collapse of the bumper cover support of FIG. 4 for an off-center impact on the bumper cover support.

For example, FIG. 5 schematically depicts a cross section of the bumper cover support 106 of FIG. 4 indicating one mode of collapse (depicted with a dashed line C1) when the impact location is at the intersection of sidewall 122a and front wall 124a. In this embodiment, the force (indicated by arrow "I" to illustrate an impact location at or adjacent to an impacted hinge 126b) incident on the bumper cover support 106 at the intersection of sidewall 122a and front wall 124a causes sidewall 122a to rotate about hinge 126a in a direction shown by arrow D1 towards the base 120. At the same time, front wall 124a rotates about hinge 126b in a clockwise direction as shown by arrow D1 and away from sidewall 122a while front wall 124b rotates about hinge 126d in a counterclockwise direction shown by arrow D2 toward front wall 124a. Sidewall 122b rotates in a counterclockwise direction as shown by arrow D2 about hinge 126e towards the base 120. In this mode, the collapse of the bumper cover support 106 is asymmetrical due to the offset location of impact. For example, in embodiments, and as shown in FIG. 5 and described above, the impacted hinge is one of the second set of center-facing hinges in a first mode of collapse having a first loading condition. In the first mode, an impacted sidewall is one of the pair of sidewalls that is connected to the impacted hinge. The impacted sidewall rotates about one of a first set of center-facing hinges that connects the impacted sidewall to the base. The outwardly-facing hinge is downwardly displaced in a −x direction away from the impacted sidewall and toward the other of the first set of center-facing hinges in a +y direction. And the other of the pair of sidewalls is asymmetrically rotated inward about the other of the first set of center-facing hinges toward the center.

Figure 6:
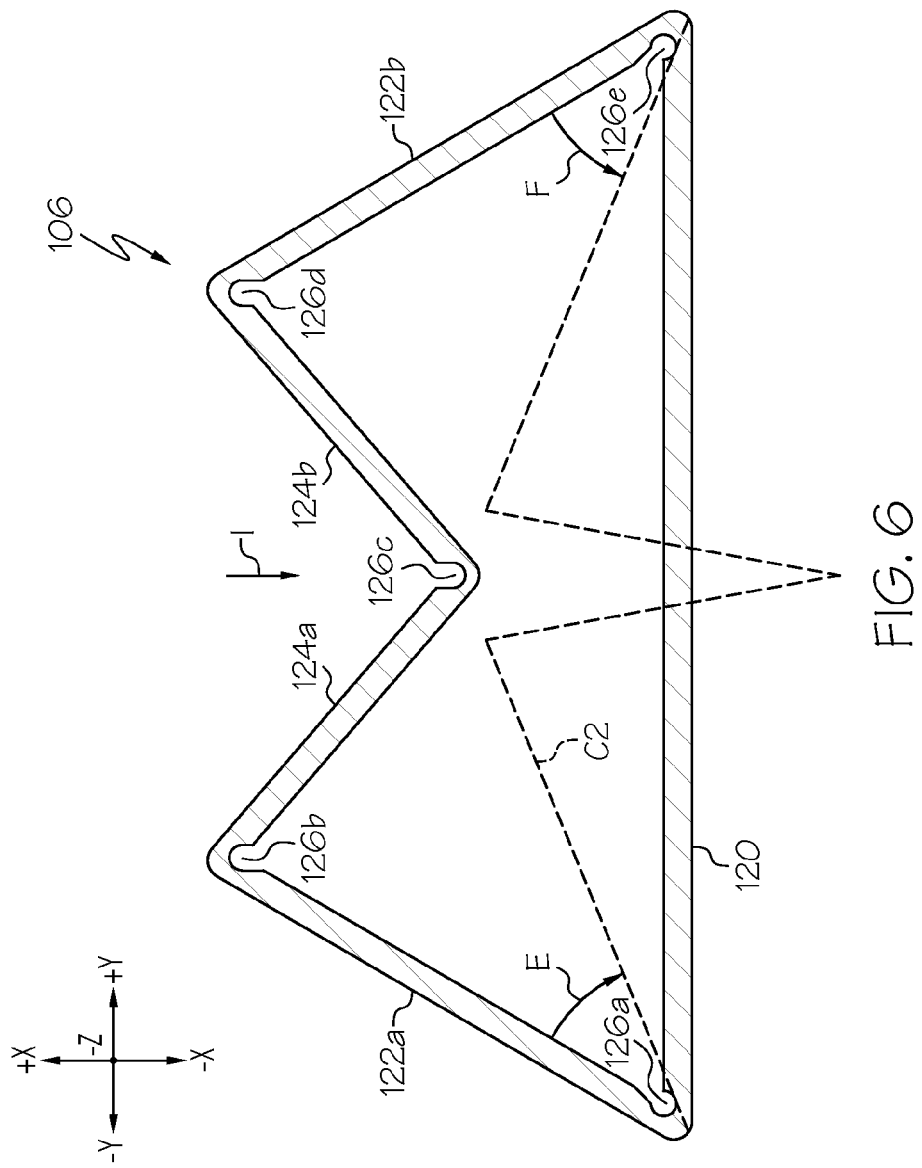
FIG. 6 schematically depicts one mode of collapse of the bumper cover support of FIG. 4 for an on-center impact on the bumper cover support.

FIG. 6 schematically depicts another example of a mode of collapse (depicted with a dashed line C2) when the impact location is centered on the front walls 124a, 124b. In this embodiment, the force (indicated by arrow "I" to illustrate the impact location along an impacted hinge 126c) incident on the bumper cover support 106 causes sidewall 122a to rotate about hinge 126a in a direction shown by arrow E towards the base 120. Similarly, sidewall 122b rotates about hinge 126e in a direction shown by arrow F towards the base 120. At the same time, front wall 124a and front wall 124b rotate toward one another about hinge 126c as each of the front wall 124a, 124b translate towards the base 120. In this mode, the collapse of the bumper cover support 106 is symmetrical due to the location of impact. In embodiments, the base 120 may have a central opening permitting ends of the front walls 124a, 124b connected at hinge 126c to translate through the base 120. In embodiments, the bumper reinforcement 102 may have a central opening permitting ends of the front walls 124a, 124b connected at hinge 126c that translate through the base 120 to translate through the bumper reinforcement 102. For example, in embodiments, and as shown in FIG. 6 and described above, the impacted hinge is the outwardly-facing hinge in a second mode of collapse having a second loading condition. In the second mode, the pair of sidewalls symmetrically collapse toward the center and rotate about a first set of center-facing hinges. And the outwardly-facing hinge is displaced in a central downward direction.

Based on the foregoing, it should be understood that the structure of the bumper cover support 106 permits the preferential collapse of the bumper cover support 106 when a load is applied to the bumper cover support in the frontal impact direction (i.e., the −x direction of the coordinate axes shown in the figures). The various modes of collapse are facilitated by the inclusion of hinges between the various wall segments of the bumper cover support 106, as described above. However, the wall segments (i.e., the base 120, sidewalls 122a, 122b, and front walls 124a, 124b) also provide for a substantially more rigid structure in the +/−z direction of the coordinate axes shown in figures. As a result, the bumper cover 108 of the bumper assembly 100 depicted in FIG. 2 is more rigid (less compliant) in the +/−z direction than in the −x direction, and requires significantly more force to deform the bumper cover 108 in the +/−z direction than in the −x direction.

Figure 7:
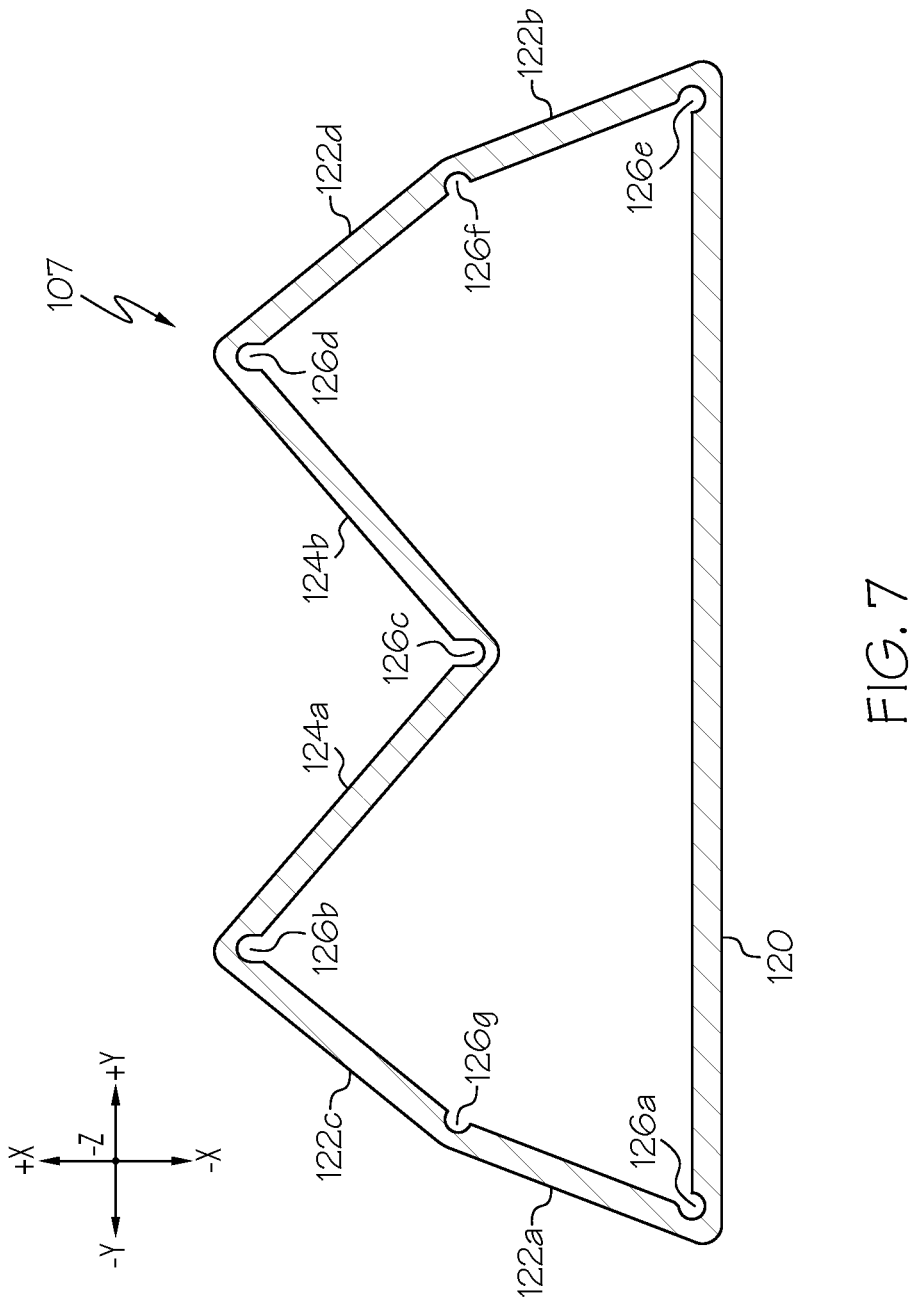
FIG. 7 schematically depicts an alternative embodiment of a bumper cover support.
Figure 8:
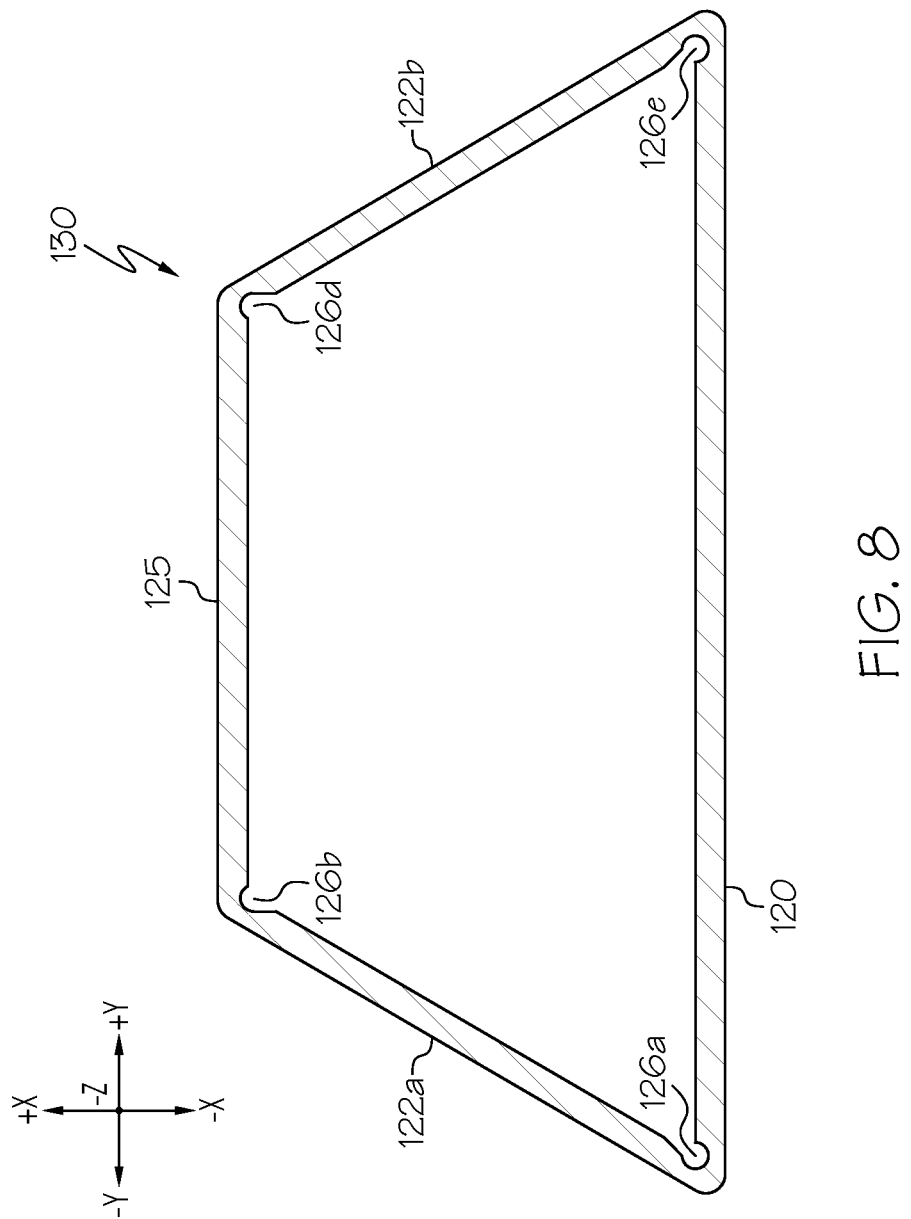
FIG. 8 schematically depicts another alternative embodiment of a bumper cover support.
Figure 9:
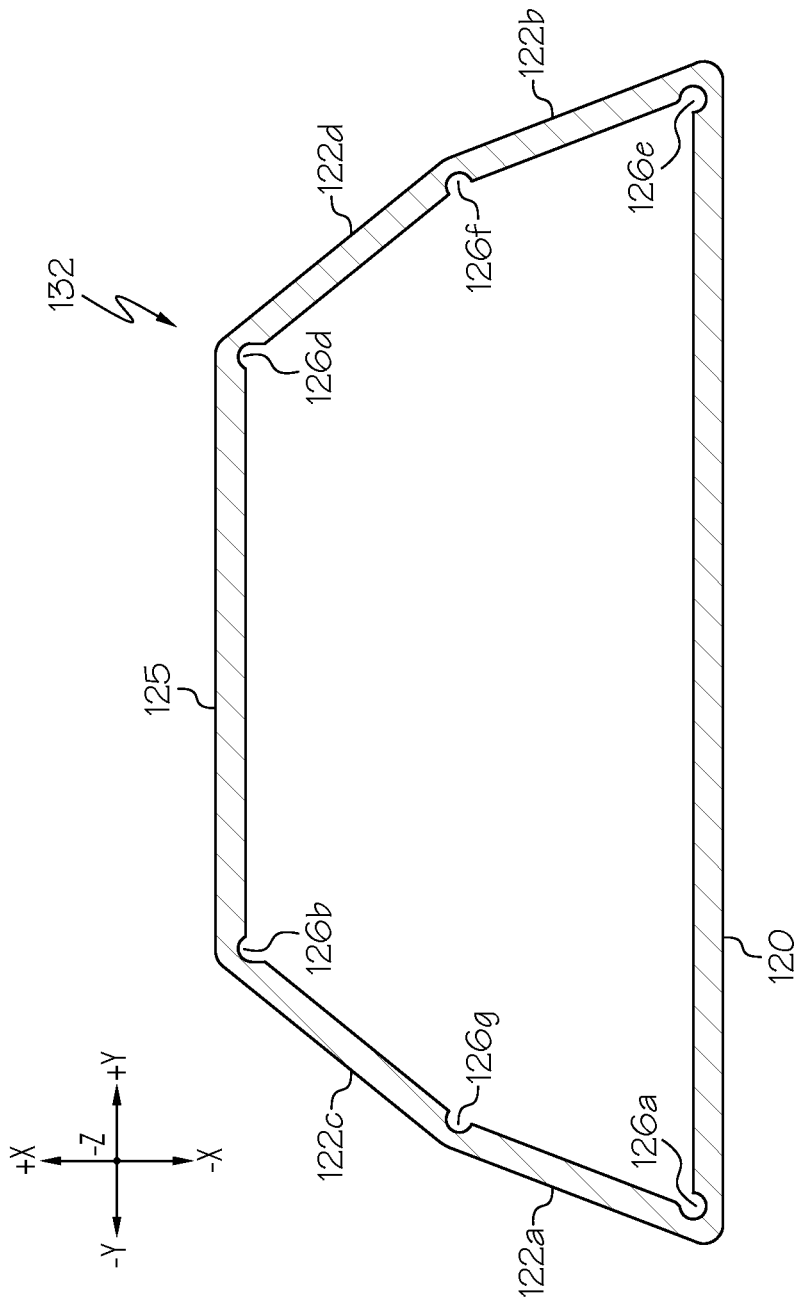
FIG. 9 schematically depicts yet another alternative embodiment of a bumper cover support.

While FIGS. 4-6 schematically depict one embodiment of a structure for a bumper cover support 106, it should be understood that other configurations of the bumper cover support are possible and contemplated. For example, the number and positioning of the hinges may be adjusted to control the compliance of the bumper cover support 106. Specifically, FIG. 7 depicts another embodiment of a bumper cover support 107 in which the bumper cover support 107 contains additional sidewalls 122c, 122d joined to sidewalls 122a, 122b, respectively, with hinges 126g, 126f. The addition of hinges may increase the compliance of the bumper cover support, making the bumper cover support more susceptible to collapse under lower applied loads. Further, FIG. 8 depicts another embodiment of a bumper cover support 130 in which the bumper cover support 130 contains a wall defined by a single contact face 125 (rather than a pair of front walls 124a, 124b) with hinges 126a-126d to form an isosceles trapezoid. FIG. 9 depicts yet another embodiment of a bumper cover support 132 in which the bumper cover support 132 forms parallel top and bottom sides of an isosceles trapezoid with, respectively, the contact face 125 and the base 120 and contains additional sidewalls 122c, 122d joined to sidewalls 122a, 122b, respectively, with hinges 126g, 126f.

It should now be understood that the embodiments described herein provide for a bumper assembly which includes a bumper reinforcement, a plurality of bumper cover supports, and a plurality of pedestrian energy absorbers. The plurality of bumper cover supports are more compliant in a front impact direction than in a vertical direction. The bumper cover is positioned over the plurality of bumper cover supports such that the bumper cover, like the bumper cover supports, is more compliant in a front impact direction than the vertical direction. The resulting relative increase in the rigidity of the bumper cover may improve consumer perception with regards to the quality of the vehicle.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bumper assembly for a vehicle, the bumper assembly comprising:
   a bumper reinforcement having a front face and a top face, wherein the front face is disposed below and extends away from the top face;
   a plurality of energy absorbers positioned adjacent to the front face of the bumper reinforcement, wherein the plurality of energy absorbers have forward contact surfaces and are compliant in a front impact direction that intersects the forward contact surfaces;
   one or more bumper cover supports positioned at least one of atop and adjacent to the bumper reinforcement, wherein each of the one or more bumper cover supports is more rigid in a vertical direction than in the front impact direction; and
   a bumper cover disposed over and around the bumper reinforcement, the plurality of energy absorbers, and the one or more bumper cover supports.

2. The bumper assembly of claim 1, wherein the front impact direction is disposed at approximately a 90° angle with respect to a portion of the front face of the bumper reinforcement.

3. The bumper assembly of claim 1, wherein the one or more bumper cover supports extend away from the front face of the bumper reinforcement and cantilever over at least one of the plurality of energy absorbers.

4. The bumper assembly of claim 3, wherein:
   the one or more bumper cover supports are offset from the forward contact surfaces of the plurality of energy absorbers in the front impact direction; and
   the front impact direction is disposed at approximately a 90° angle with respect to the vertical direction.

5. The bumper assembly of claim 1, wherein:
   at least a first bumper cover support of the one or more bumper cover supports includes at least a pair of sidewalls, a front wall, and a base; and
   the pair of sidewalls, the front wall, and the base form a substantially enclosed perimeter of an isosceles trapezoid.

6. The bumper assembly of claim 1, wherein:
   at least a first bumper cover support of the one or more bumper cover supports includes at least a pair of sidewalls, a pair of front walls, and a base;
   the pair of sidewalls, the pair of front walls, and the base form a substantially enclosed perimeter;
   each sidewall of the pair of sidewalls tapers toward the corresponding sidewall and extends away from the base; and
   the pair of sidewalls are coupled to the base via a first set of center-facing hinges that open toward a center of the first bumper cover support.

7. The bumper assembly of claim 6, wherein:
   each front wall of the pair of front walls is disposed opposite the base and coupled to a tapering end of the pair of sidewalls via a second set of center-facing hinges that open toward the center of the first bumper cover support; and
   the pair of front walls are angled toward the center of the first bumper cover support.

8. The bumper assembly of claim 7, wherein the pair of front walls are coupled to one another by an outwardly-facing hinge that opens away from the center of the first bumper cover support.

9. The bumper assembly of claim 8, wherein:
   the one or more bumper cover supports facilitate a controlled collapse under one or more loading conditions; and
   at least one of a front wall of the pair of front walls or a sidewall of the pair of sidewalls is rotatable around at least one of the center-facing hinges or the outwardly-facing hinge.

10. The bumper assembly of claim 8, wherein:
    the one or more bumper cover supports facilitate a controlled collapse of one or more modes including at least a first mode having a first loading condition or a second mode having a second loading condition when a force is applied along the front impact direction.

11. The bumper assembly of claim 10, wherein when the force is applied at or adjacent to one of the second set of center-facing hinges, the controlled collapse is in the first mode, wherein:
    an impacted sidewall is one of the pair of sidewalls that is connected to one of the second set of center-facing hinges;
    the impacted sidewall rotates about one of the first set of center-facing hinges that connects the impacted sidewall to the base;
    the outwardly-facing hinge is downwardly displaced in a direction away from the impacted sidewall and toward the other of the first set of center-facing hinges; and
    the other of the pair of sidewalls is asymmetrically rotated inward about the other of the first set of center-facing hinges toward the center.

12. The bumper assembly of claim 10, wherein when the force is applied at or adjacent to the outwardly-facing hinge, the controlled collapse is in the second mode, wherein:
    the pair of sidewalls symmetrically collapse toward the center and rotate about the first set of center-facing hinges; and
    the outwardly-facing hinge is displaced toward the center of the substantially enclosed perimeter.

13. A bumper cover support for a bumper assembly of a vehicle, the bumper cover support comprising:
    an injection moldable polymer material, wherein the bumper cover support is formed from the injection moldable polymer material; and
    at least a pair of sidewalls, a pair of front walls, and a base, wherein:
        at least a portion of the bumper cover support is positioned at least one of above or against a bumper reinforcement of the vehicle; and
        the pair of sidewalls, the pair of front walls, and the base form a substantially enclosed perimeter having walls that define a center, wherein the bumper cover support is more rigid in a vertical direction than in a front impact direction normal to the vertical direction and to the base of the bumper cover support.

14. The bumper cover support of claim 13, wherein:
each sidewall of the pair of sidewalls tapers toward the other sidewall and extends away from the base;
the pair of sidewalls are coupled to the base via a first set of center-facing hinges; and
the first set of center-facing hinges open toward the center of the bumper cover support.

15. The bumper cover support of claim 14, wherein:
each front wall of the pair of front walls is coupled to a tapering end of the pair of sidewalls via a second set of center-facing hinges and is disposed opposite the base; and
the pair of front walls are angled toward the center of the bumper cover support.

16. The bumper cover support of claim 15, wherein the pair of front walls are coupled by an outwardly-facing hinge that opens away from the center of the bumper cover support.

17. The bumper cover support of claim 16, wherein:
each of the pair of sidewalls has a first thickness;
the at least one of the center-facing hinges or the outwardly-facing hinge is a cutaway wall portion defining a relief having a second thickness; and
the second thickness is less than or equal to about 25% of the first thickness.

18. The bumper cover support of claim 16, wherein:
the bumper cover support facilitates a controlled collapse when a force is applied along the front impact direction under a first loading condition defining a first mode or a second loading condition defining a second mode; and
at least one of a front wall of the pair of front walls or a sidewall of the pair of sidewalls is rotatable around at least one of the center-facing hinges or the outwardly-facing hinge.

19. The bumper cover support of claim 18, wherein:
when the force is applied at or adjacent to one of the second set of center-facing hinges, the controlled collapse is in the first mode, wherein:
an impacted sidewall is the sidewall that is connected to one of the second set of center-facing hinges;
the impacted sidewall rotates about one of the first set of center-facing hinges that connects the impacted sidewall to the base;
the outwardly-facing hinge is downwardly displaced in a direction away from the impacted sidewall and toward the other of the first set of center-facing hinges, and
wherein the other sidewall is asymmetrically rotated inward about the other of the first set of center-facing hinges toward the center, and
when the force is applied at or adjacent to the outwardly-facing hinge, the controlled collapse is in the second mode, wherein:
the pair of sidewalls symmetrically collapse toward the center and rotate about the first set of center-facing hinges; and
the outwardly-facing hinge is displaced toward the center of the substantially enclosed perimeter.

20. A vehicle comprising:
a bumper reinforcement having a front face and a top face, wherein the front face is disposed below and extends away from the top face;
a plurality of energy absorbers having forward contact surfaces and positioned adjacent to the front face of the bumper reinforcement, wherein the plurality of energy absorbers are compliant in a front impact direction that intersects the forward contact surfaces;
one or more bumper cover supports positioned at least one of atop and adjacent to the bumper reinforcement, wherein the one or more bumper cover supports extend away from the front face of the bumper reinforcement and cantilever over at least one of the plurality of energy absorbers, wherein each of the one or more bumper cover supports is more rigid in a vertical direction than in the front impact direction; and
a bumper cover comprising an inner surface, wherein the bumper cover is disposed over and around the bumper reinforcement, plurality of energy absorbers, and the one or more bumper cover supports, wherein the one or more bumper cover supports are spaced apart from the inner surface of the bumper cover.

\* \* \* \* \*